V. SMITH.
LEACHING VALVE.
APPLICATION FILED MAR. 16, 1916.

1,238,209.

Patented Aug. 28, 1917.

WITNESSES:
Arthur J. Farnsworth
Herman R. Johnson

INVENTOR:
Vernia Smith

UNITED STATES PATENT OFFICE.

VEUNIA SMITH, OF SANTA MONICA, CALIFORNIA.

LEACHING-VALVE.

1,238,209.  Specification of Letters Patent.  Patented Aug. 28, 1917.

Application filed March 16, 1916.  Serial No. 84,711.

*To all whom it may concern:*

Be it known that I, VEUNIA SMITH, a citizen of the United States, residing at Santa Monica, in the county of Los Angeles and State of California, have invented a new and useful Leaching-Valve, of which the following is a specification.

My invention relates to improvements in leaching valves in which a free passage is allowed to the fluid passing through in one certain direction, but in which a reversal of the direction of flow of the fluid is automatically prevented; and the objects of my improvement are, first, to make it difficult for particles of solid material to find lodgment within or upon the valve; second, to make it easy to clean and remove any film of liquid or foreign substance that might form upon its surface, and, third, to provide means for distributing the discharge in a uniform manner, radially, in a plane at right angles to the main axis of the valve.

My invention is particularly applicable to coffee making machines where the coffee is leached from the ground beans by means of hot water discharged from a pipe lowered into, or embedded in the ground coffee. In such machines it is usual, and desirable, to have a distributer attached to the discharge end of the hot water pipe to direct the flow uniformly through the mass of ground coffee. When the coffee has been leached, and the grounds have been removed, it is difficult or impossible with the ordinary types of distributers, to completely clean them, and remove the particles of grounds that have collected within, or upon them, without causing additional water to run through the supply pipe. This has the effect of washing the particles collected in the distributer into the made coffee, and at the same time introduces additional water into the latter. Both of these effects are extremely undesirable, from the standpoint of quality of product, and from the standpoint of sanitation in case the coffee making machine has previously been out of use for a period.

I attain the objects of my invention by the mechanism illustrated in the accompanying drawing, in which—

Figure 1:
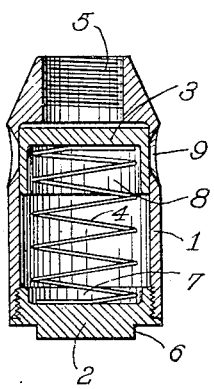
Figure 3:
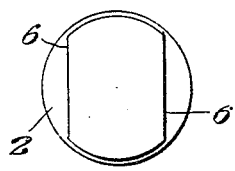
Figure 2:
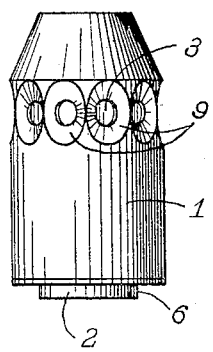
Figure 4:
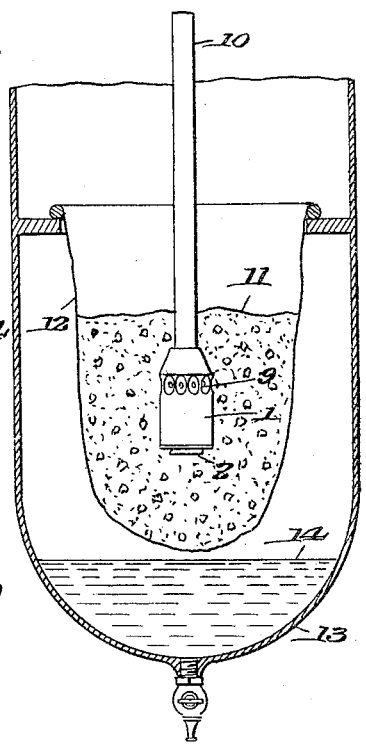

Figure 1 is a vertical section of the valve; Fig. 2 is a vertical elevation of the same; Fig. 3 is a bottom view of the valve showing the construction of cap 2; and Fig. 4 is a sectional elevation of a portion of a coffee making machine, drawn to a smaller scale and showing the hot water supply pipe and valve in their operative positions.

Similar reference numbers refer to similar parts throughout both views.

The valve body 1 has a cap or plug 2 fitted to its lower end. In the construction shown this plug 2 is screwed into the valve body, and has formed upon it two parallel flat faces 6 to which a wrench may be applied. The valve body has a suitable thread formed at its upper end for screwing it onto the supply pipe. This thread is shown at 5. The valve body also has numerous openings 9 formed around its periphery near the upper end. These openings are flared at their outer, or discharge, end in such a manner that it is difficult for particles of solid material to find lodgment within them, and at the same time so that they can readily be cleaned of any film of liquid by wiping with a cloth.

Within the valve body the piston 3 is free to move, being governed in its motion and position by the pressure of the fluid above it, and by the resisting action of the spring 4 beneath it.

I prefer to make the piston 3 in the form shown, and containing a large circular, concentric recess 8 in its lower face. This serves to reduce the weight of the piston, and therefore its inertia, and at the same time serves to center the spring and prevent the latter from rubbing upon the walls of the cylindrical bore of the body of the valve when the piston is in motion.

For a similar reason I prefer to make the plug 2 in the form shown, containing a large circular, concentric recess in its upper face, as shown at 7.

Referring to Fig. 4, illustrating a typical application of my invention to a coffee making machine, 10 indicates the hot water supply pipe with the valve on its lower end. The latter is embedded in the mass of ground coffee 11, contained in the suspended cloth sack 12. The hot water leaving openings 9 percolates through the coffee and the leached liquor passes through the pores of the sack 12, and collects in the bottom of receptacle 13, as shown at 14.

In operation the valve works as follows:

With no pressure, or only a small pressure, in the supply pipe, the piston will be in the position shown in the drawing. When the pressure in the supply pipe has reached a certain point it will act upon the upper face of piston 3 to overbalance the resisting tendency of the spring 4, and the piston will move downward. A continued increase of pressure in the supply pipe will cause the piston to move still farther downward until it has moved past the upper side of the openings 9, and the fluid will discharge through these openings. The spring 4 will be so proportioned that, when the pressure in the supply pipe has reached the normal working pressure, the piston 3 will have moved downward at least to a point where the openings 9 will be completely open, and free for the passage of the liquid through them in an outward direction. As soon as the pressure in the supply pipe falls, and before it has reached the zero point, the piston will have traveled upward, and closed the openings. It is therefore evident that, if the openings 9 are open at all, the pressure is greater within the valve than it is outside of it, and the flow must be outward. It follows that no foreign particles can enter the valve through the openings 9, and as there is no place within the latter where they can find lodgment, the valve will be and remain self cleaning, except for the possible formation of a film of liquid upon the outside, or small adhering particles that can readily be removed by wiping with a cloth.

It is also evident that the form, and location, of the discharge openings provide an excellent distribution of the fluid radially from the valve in a direction perpendicular to its axis, and uniformly around its circumference.

The functions of my valve are fourfold: First, the entrance of water into the mass to be leached is prevented until a pressure has been reached that corresponds to the temperature that is desired. If the water is heated in a closed boiler it will form steam and generate pressure. At a pre-determined pressure, depending upon the strength of the spring in my valve, the latter will open and allow the hot water to pass into the ground coffee. Until this point of pressure has been reached the valve will remain closed and thus prevent the entrance of water of insufficient temperature.

Second, my valve acts as a non-return valve. If the level of the leached liquor in receptacle 13 should be above the end of pipe 10, and the steam in the boiler should cool off and condense, a vacuum would be created in the boiler, and, unless prevented from doing so by the action of my valve, the leached liquor would flow back through the supply pipe.

Third, my valve acts as a distributer of the flow passing into the mass to be leached as a result of the positioning of the openings 9.

Fourth, by reason of the flared openings in a manner already explained, the solid particles of the mass to be leached cannot find lodgment in or upon my valve. There is thus no opportunity afforded for them to collect and decay. This is a very important matter in the case of coffee machines and similar devices. It is evident that where the supply pipe 10 is fixed in the machine as is usually the case, and where a distributer of some usual form is attached to its discharge end, the collection of particles of solid matter is easily possible. There is no easy way of removing the collected particles in such cases except by washing them out with water introduced through pipe 10. This water then passes into the leached liquor and dilutes it. As a consequence the cleaning is seldom perfectly done, and, in comparison, the sanitary advantages of my valve are most important.

I claim:

1. In combination with a leaching receptacle having a supply pipe, a cylindrical valve casing mounted upon the discharge end of said pipe and interiorly connected therewith, said casing having outlet ports that are outwardly flared from an edge; and a piston within said casing adapted to uncover said ports to permit outward flow and to cover said ports to prevent inward flow.

2. In combination with a leaching receptacle having a supply pipe, a cylindrical valve casing interiorly connected with said pipe and adapted to be embedded in the material to be leached, said casing having outlet ports that are outwardly flared from an edge; and a piston adapted to reciprocate within said casing to uncover said ports to permit outward flow and to cover said ports to prevent inward flow.

3. In combination with a leaching receptacle having a supply pipe whose discharge end is adapted to be embedded in the material to be leached, a cylindrical valve casing mounted upon the said discharge end and interiorly connected therewith, said casing having a plurality of peripheral outlet ports that are outwardly flared from an edge; and a piston adapted to reciprocate within said casing to uncover said ports to permit outward flow and to cover said ports to prevent inward flow.

4. In combination with a leaching receptacle having a supply pipe whose discharge end is adapted to be embedded in the material to be leached, a cylindrical valve casing mounted upon the said discharge end and interiorly connected therewith, said casing having a plurality of peripheral outlet ports that are outwardly flared from an edge; a piston adapted to move longitudinally within said casing so as to open and close said ports; and a spring adapted to oppose the motion of said piston to open said ports.

5. In combination with a leaching receptacle having a supply pipe whose discharge end is adapted to be embedded in the material to be leached, a cylindrical valve casing mounted upon the said discharge end and interiorly connected therewith, said casing having a plurality of peripheral outlet ports that are outwardly flared from an edge; a piston adapted to move longitudinally within said casing so as to open and close said ports, and to be acted upon by the pressure of the fluid in said supply pipe to open said ports; and a spring adapted to oppose the motion of said piston to open said ports and to restore said piston to a position where said ports are closed when the pressure of said fluid has been removed.

6. In combination with a leaching receptacle having a supply pipe whose discharge end is adapted to be embedded in the material to be leached, a cylindrical valve casing mounted upon the said discharge end and interiorly connected therewith, said casing having a plurality of peripheral outlet ports that are outwardly flared from an edge; a piston adapted to move longitudinally within said casing so as to open and close said ports, and to be acted upon by the pressure of the fluid in said supply pipe to open said ports; a spring adapted to oppose the motion of said piston to open said ports and to restore said piston to a position where said ports are closed when the pressure of said fluid has been removed; and a plug fitted into the end of said casing for said spring to re-act against.

VEUNIA SMITH.

Witnesses:
ARTHUR J. FARNSWORTH,
HERMAN R. JOHNSON.

Copies of this patent may be obtained for five cents each, by addressing the "Commissioner of Patents, Washington, D. C."